United States Patent [19]

Anderson

[11] 3,958,670
[45] May 25, 1976

[54] BRAKE ACTUATING APPARATUS INCLUDING PISTON AND ADJUST/RESET MEANS

[75] Inventor: Bruce W. Anderson, South Bend, Ind.

[73] Assignee: The Bendix Corporation, South Bend, Ind.

[22] Filed: June 30, 1975

[21] Appl. No.: 591,541

[52] U.S. Cl. ............................ 188/196 R; 188/71.8
[51] Int. Cl.² ......................................... F16D 65/54
[58] Field of Search ............ 188/71.8, 196 P, 196 R

[56] References Cited
UNITED STATES PATENTS

| | | |
|---|---|---|
| 3,542,165 | 11/1970 | Lucien ............................ 188/196 P |
| 3,729,072 | 4/1973 | Borkowski ...................... 188/196 P |
| 3,887,047 | 6/1975 | Harnish et al ................... 188/196 R |

*Primary Examiner*—Duane A. Reger
*Attorney, Agent, or Firm*—Gordon H. Chenez; William N. Antonis

[57] ABSTRACT

A multiple disc brake having a brake actuating annular pressure plate energized by a plurality of circumferentially arranged fluid pressure responsive pistons housing brake adjusting/reset members including a deformable fixed tube and associated movable ball for deforming the same wherein the deformable tube is engageable with spaced apart fixed stops and spring actuated from one stop to a second stop upon release of the brake to establish a predetermined brake running clearance.

10 Claims, 3 Drawing Figures

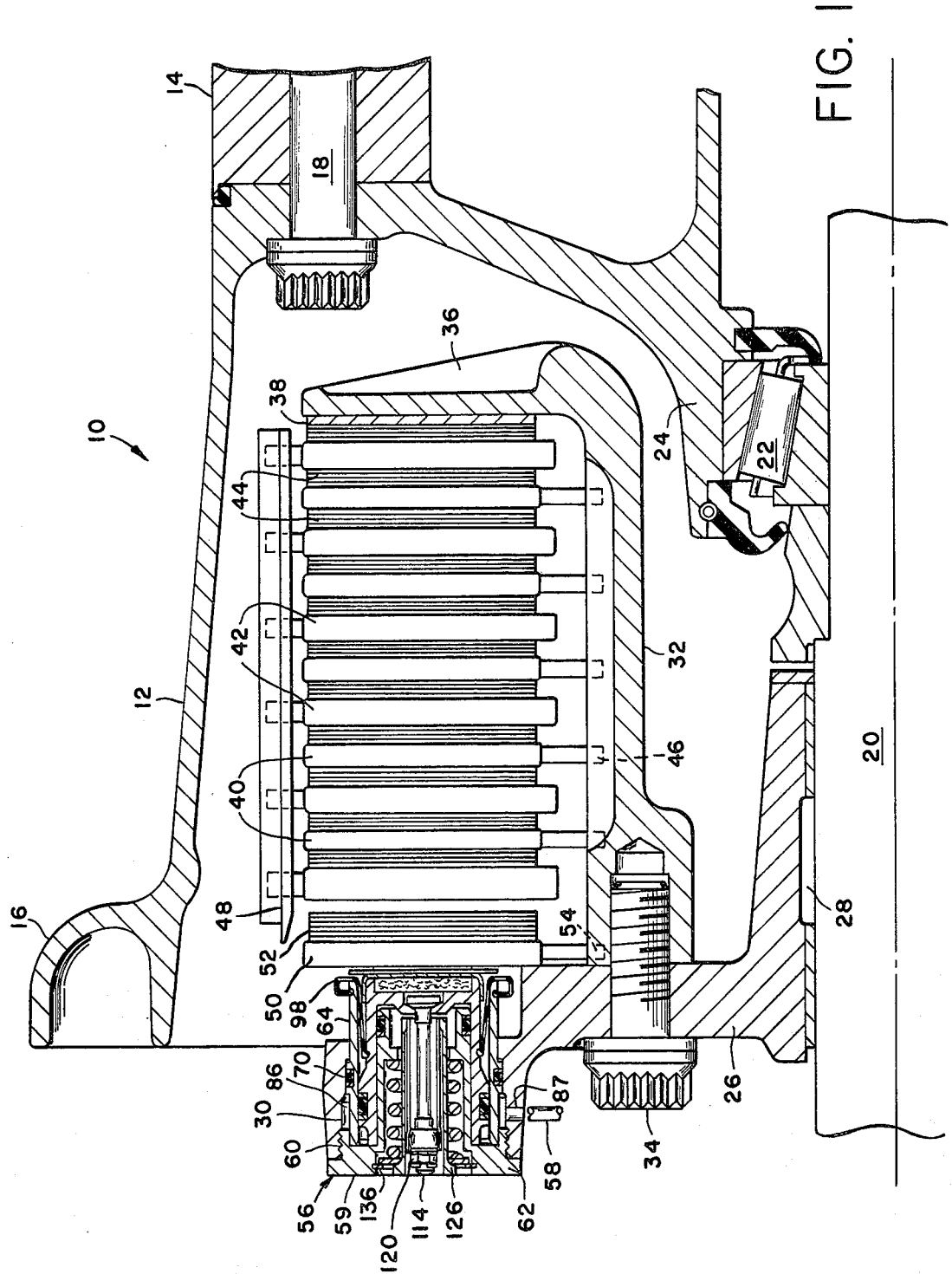

BRAKE ACTUATING APPARATUS INCLUDING PISTON AND ADJUST/RESET MEANS

BACKGROUND OF THE INVENTION

In conventional aircraft multiple disc brakes having an annular pressure plate, it has been the practice to provide a plurality of circumferentially arranged spaced apart fluid pressure actuated pistons connected to actuate the brake upon demand and a plurality of circumferentially arranged spaced apart brake adjust/reset devices operatively connected to the pressure plate between the pistons for adjusting the axial position of the pressure plate to compensate for wear of the brake discs and permit retraction of the pressure plate to maintain a predetermined running clearance between discs upon release of the brake. Reference is made to U.S. Pat. No. 3,376,959 to O. L. Holcomb, Jr. et al for an example of a conventional brake having the above-mentioned characteristics.

It has been found that such conventional brake piston and adjuster/reset arrangements are not entirely satisfactory due to distortion of the annular pressure plate resulting from uneven force distribution thereon as a consequence of the spaced apart brake adjust/reset devices and the position of the same relative to the brake actuating pistons.

At least one known attempt has been made to combine the piston and adjuster/reset apparatus to thereby place the same as well as the forces derived therefrom in coaxial relationship. Reference is made to U.S. Pat. No. 3,729,072 to D. F. Borkowski for a detailed description of the above-mentioned combined piston and adjuster/reset device which has distinct advantages over the prior art devices but which is not without certain undesirable features. It has been found that wear or other deterioration such as metal fatigue or the like of the component members of the brake actuating piston and adjuster/reset device is accelerated by wear and/or brake vibration which, in the case of exposure to the pressurized brake fluid, results in undesirable particle contamination of the working pressurized fluid. Another undesirable characteristic feature of many related prior art structures is a requirement for partial or complete disassembly of the disc brake structure to gain access to the brake actuating piston and adjuster/reset mechanism for routine maintenance or repair of the same.

SUMMARY OF THE INVENTION

The present invention relates to disc brake actuating mechanism and particularly to fluid pressure responsive brake actuating piston means and adjust/reset means therefor to compensate for brake wear.

It is an object of the present invention to provide disc brake actuating piston means and adjust/reset means therefor wherein the component annular parts thereof are coaxially arranged in a compact relationship such that the working forces derived therefrom act through a common axis.

It is another object of the present invention to provide brake actuating means and adjust/reset means therefor for a multiple disc aircraft brake wherein the actuating and adjust/reset means may be removed or replaced without disturbing the remaining portion of the disc brake.

It is an important object of the present invention to provide disc brake pressurized fluid actuated piston means and adjust/reset means therefor wherein the adjuster/reset means is isolated from the pressurized fluid to avoid particle contamination of the pressurized fluid.

Other objects and advantages of the present invention will be apparent from the following description and accompanying drawings.

BRIEF DESCRIPTION OF THE DRAWINGS

FIG. 1 is a schematic representation of a wheel and brake assembly embodying the present invention.

DESCRIPTION OF THE PREFERRED EMBODIMENT

Figure 3:
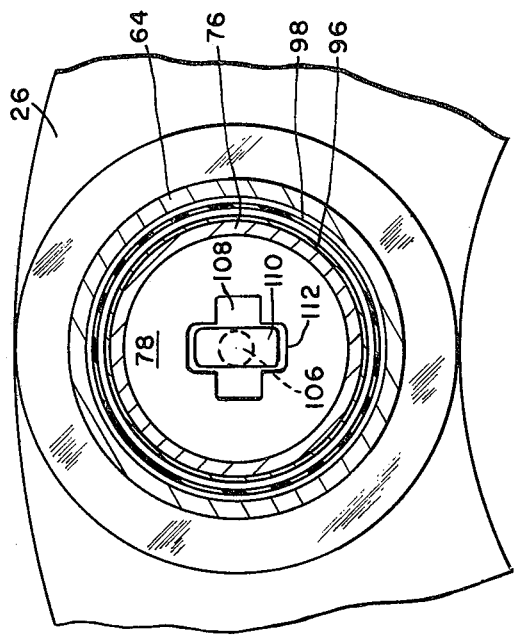
FIG. 3 is a sectional view taken on line 3—3 of FIG. 2.
Figure 2:
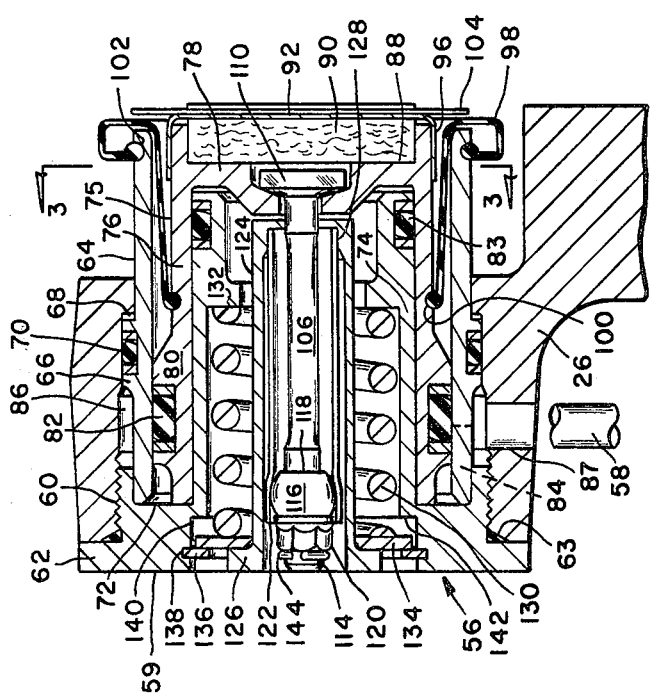
FIG. 2 is a sectional view of the present invention shown removed from the wheel and brake structure of FIG. 1 and drawn in enlarged form.

Referring to the drawings, numeral 10 designates a conventional wheel and brake assembly including annular wheel half portions 12 and 14, only one of which is shown in cross section. The wheel portions 12 and 14 are each provided with a tire retaining flange portion 16 for retaining a tire, not shown, thereon. A plurality of circumferentially spaced apart bolt and nut combinations 18 serve to fixedly secure the wheel portions 12 and 14 together. The wheel portion 12 is rotatably carried on a fixed axle 20 by conventional bearing means 22 interposed between a hub portion 24 and axle 20.

A rotatably fixed annular brake carrier 26 suitably keyed to fixed axle 20 by splines 28 is provided with a plurality of circumferentially spaced apart open end chambers or cavities 30 only one of which is shown. An annular torque tube 32 is fixedly secured to brake carrier 26 by a plurality of circumferentially spaced apart bolts 34, only one of which is shown, extending through carrier 28 into threaded engagement with torque tube 32. The torque tube 32 is provided with an integral annular brake backing plate 36 having an annular section of friction material or lining 38 fixedly secured thereto.

A plurality of annular brake stator members 40 are interleaved with a plurality of annular brake rotor members 42. The brake stator members 40 are each provided with lining 44 fixedly secured to opposite sides thereof and are suitably keyed as at 46 for axial movement on torque tube 32. The rotor members 42 are suitably keyed for axial movement to a spline member 48 which, in turn, is fixedly secured to wheel portion 12. The interleaved or stacked rotors 42 and stators 40 are adapted to be compressed together between backing plate 36 and a movable pressure plate 50 to provide the desired braking or retardation of the wheel. The pressure plate 50 has lining 52 fixedly secured thereto and is suitably keyed as at 54 for axial movement on torque tube 32.

The actuating force imposed on pressure plate 50 tending to compress the rotors and stators 42 and 40 together is derived from a plurality of pressurized fluid responsive motor assemblies 56 embodying the present invention secured in chambers 30 and responsive to pressurized fluid conducted to chamber 30 via passage means including a passage 58 from a conventional operator controlled pressure source, not shown.

The motor assemblies 56 each include an annular member 59 provided with a threaded outer wall portion 60 and a flange portion 62 extending radially outwardly therefrom. The carrier 26 is suitably threaded at one end of cavity 30 to receive wall portion 60. The flange portion 62 is suitably formed to be engaged by conventional tool means, not shown, for rotating annular member 59 into position. A flexible seal 63 compressed between flange portion 62 and carrier 26 serves as a seal against fluid leakage therebetween. A sleeve 64 slidably received by cavity 30 is provided with an enlarged diameter section 66 adapted to bear against a shoulder 68 formed in the wall of cavity 30. The enlarged diameter section 66 is suitably recessed to receive an O-ring seal 70 which provides a fluid seal between adjacent surfaces of sleeve 64 and wall of cavity 30.

The wall portion 60 is adapted to telescope over the adjacent end wall of sleeve 64 to the extent that the end of sleeve 64 bears against an annular wall portion 72 extending from wall portion 60 to a reduced diameter tubular section 74 having a spaced apart relationship with sleeve 64 coaxial therewith. The wall portion 60 and sleeve 64 preferably have a press fit. A piston 75 having a skirt section 76 and a base section 78 is arranged to telescope on tubular section 74. The skirt section 76 is provided with an enlarged diameter portion 80 suitably recessed to receive an O-ring seal 82 which resists fluid leakage between portion 80 and sleeve 64. The tubular section 74 is suitably recessed to receive an O-ring seal 83 which resists fluid leakage between skirt section 76 and tubular section 74. The skirt section 76 is adapted to abut wall portion 72 when the piston 75 is retracted as shown. The piston 75 is responsive to pressurized fluid conducted to the annular end area of skirt portion 76 via a plurality of openings 84 in sleeve 64, an annular chamber 86 between carrier 26 and sleeve 64 and a passage 87 in carrier 26 which passage 87 is connected to receive pressurized fluid from the operator controlled source, not shown.

The base section 78 is provided with a mating block of suitable heat insulation material 90 held in place by a retaining cap 92. The retaining cap 92 is provided with flexible side wall portions 96 adapted to slide over piston 75 to thereby retain block 90 in position. A conventional flexible seal or dust boot 98 having opposite end portions suitably formed to snap into annular recesses 100 and 102 formed in skirt section 76 and sleeve 64, respectively, serves to exclude dirt or other debris from the interior wall of sleeve 64 against which the skirt section 76 slides. The cap 92 is provided with an annular shield 104 extending radially therefrom to shield seal 98 from pressure plate 50.

A stem or rod 106 extending through a rectangular-shaped opening 108 in base section 78 has a generally rectangular-shaped head 110 trapped in a rectangular-shaped recess 112 in base section 78 by the block 90. The stem 106 is adapted to be disengaged from base section 78 by moving stem 106 axially relative to piston 75 to disengage head 110 from recess 112 whereupon the stem 106 is rotated to align head 110 with opening 108 and withdrawn from base section 78. The stem 106 may be attached to base section 78 in a similar manner but reverse sense. The stem 106 is coaxial relative to piston 75, tubular section 74 and sleeve 64 and includes a threaded end 114 adapted to receive an annular member or button 116 threadedly engaged therewith. The button 116 bears against a shoulder 118 formed on stem 106 and is locked in position thereagainst by a lock nut 120 threadedly engaged with end 114. The radial outer surface of button 116 is curved to permit button 116 to slide along tube 122 as will be described.

A radially deformable tube 122 preferably made of metal capable of plastic deformation under a predetermined force load surrounds stem 106 coaxial therewith and is provided with an inner diameter slightly smaller than the button 116 diameter. The inner surface of tube 122 is engaged by button 116 which is forcibly gripped by tube 122 at any given position of button 116 therein. A tubular member 124 coaxial with tube 122 and in radially spaced apart relationship thereto has a radially outwardly extending annular flange 126 on one end and a reduced diameter opposite end provided with an annular recess 128. The tubular member 124 is attached at one end to tube 122 by virtue of a slip fit in recess 128. A compression spring 130 surrounding tubular member 124 and coaxial therewith is interposed between an annular shoulder 132 formed on tubular section 74 and a washer 134 bearing against flange 126 resulting in axial retraction of tubular member 124 and tube 122 as well as stem 106, by virtue of engagement of button 116 with tube 122, and piston 75. The extent to which the above members are retracted by spring 130 is defined by a snap ring 136 secured in a mating annular recess 138 formed in the wall of a reduced diameter section 140 of annular member 59 which section 140 terminates in an annular shoulder 142. The shoulder 142 is engaged by washer 134 to thereby limit movement of the latter away from snap ring 136 during a brake application as will be described. The range of axial movement of annular member 126 permitted by snap ring 136 and shoulder 142 which act as stops establishes a predetermined brake clearance upon retraction of the pressure plate 50.

The brake is energized upon an increase in pressure of fluid supplied to passage 87 from which it passes via chamber 86 and openings 84 to the annular end of skirt section 76. Each of the pistons 75 are simultaneously pressurized in the above manner resulting in movement of pressure plate 50 toward backing plate 36 between which the rotors and stators 42 and 40 are adapted to be compressed. The tubular member 124 being secured to piston 75 via tube 122, button 116 and stem 106 moves with piston 75 thereby compressing spring 130 until washer 134 engages shoulder or stop 142 whereupon the tubular member 124 is fixed in position. Assuming the pressure plate 50 has failed to move to the extent required to fully engage rotors and stators 42 and 40 as a result of brake wear, the piston 75 will continue to move in response to the pressurized fluid applied against skirt section 76. The button 116 is urged via stem 106 by piston 75 axially against the resistance of tube 122 which is deformed radially outwardly permitting the piston 75 and pressure plate 50 to advance accordingly until full engagement of the rotors and stators 42 and 40 is attained.

The brake is released upon depressurization of the skirt section 76 which results in retraction of piston 75 under the influence of spring 130 since the button 116 is gripped by tube 122 as a result of the plastic deformation of tube 122. The retraction of piston 75 is limited to the extent provided by snap ring 136 which is engaged by washer 134 thereby establishing the desired predetermined running clearance of rotor and stator members 42 and 40.

The axial movement of button 116 through tube 122 continues as necessary to compensate for wear of the linings 38, 44 and 52 upon application of the brake. Upon reaching the reduced diameter end of tubular member 124 provided with annular recess 128 the button 116 is prevented from further movement relative to tube 122 thereby necessitating overhaul of the aduster/reset portion of motor assembly 56. It will be recognized that the range of movement of button 116 in tube 122 will correspond to the permissible cumulative axial wear of the linings 38, 44 and 52.

It will be noted that the spring 130, tubular member 124, tube 122, button 116 and stem 106 are not exposed to the pressurized fluid which actuates piston 75 thereby avoiding contamination of the pressurized fluid with particles of metal which may result from movement of the various members of the adjuster/reset apparatus. The spring 130, tubular member 124, tube 122, button 116 and stem 106 are exposed to ambient air.

The radial clearance between spring 130 and tubular section 74 as well as tubular member 124 is reduced to a minimum radial vibration of the spring 130. Also, the radial spacing between the various members such as tube 122 relative to tubular section 74 and tubular member 124 relative to tubular section 74 is minimized to present a compact arrangement of these members within piston 75.

Removal of the entire piston assembly 56 is a relatively simple matter since it may be extracted from carrier 26 without disturbing the remaining brake elements. The piston 75 is forced away from pressure plate 50 by a suitable tool, not shown, such as a pry bar or the like causing skirt section to seat against wall portion 72 whereupon cap 92 may be disengaged from piston 75 and end portion of boot 98 disengaged from recess 100. The annular member 59 is unscrewed from carrier 26 and sleeve 64 withdrawn from cavity 30 on the external side i.e. side opposite to pressure plate side of carrier 26 thereby removing the entire motor assembly 56. The assembly 56 is completely disassembled by removing snap ring 136 and forcing piston 75 toward wall portion 72 to seat skirt section 76 against the latter resulting in disengagement of tube 122 from recess 128 or displacement of button 116 toward the free end of tube 122. The lock nut 120 is removed from stem 106 to permit removal of button 116 and tubular member 124 following which the stem 106 may be rotated to disengage the end thereof from base section 78. The piston 75 can be withdrawn from sleeve 64 and tubular section 74. Assembly may be accomplished by reversing the above-mentioned sequence.

Partial disassembly in the event of a broken stem 106, for example, may be made with minimum disturbance of parts. To that end, the piston 75 may be forced away from pressure plate 50 to permit sufficient room to slide retaining member 92 axially relative to piston 75 and partially withdraw block 90 from recess 88. Obviously, a broken stem 106 does not require removal of lock nut 120 to permit removal of tube 122 which may be disengaged from recess 128 and withdrawn. The stem 106 may then be urged toward block 90 to clear recess 112 and rotated to a position permitting withdrawal of head 110 through opening 108. A new stem 106 and tube 122 may be inserted by reversing the above-mentioned steps following which a button 116 is positioned on stem 106 and locked in position thereon by lock nut 120. The lock nut 120 may be safetied in position by suitable wire means 144 if desired.

Various changes or modifications in the above described preferred embodiment may be made by those skilled in the art without departing from the scope of applicant's invention as defined by the following claims.

I claim:

1. A brake actuating piston and adjust/reset means housed therein comprising:
   a casing having a cavity formed therein;
   a piston slidably carried in said cavity and responsive to a pessurized fluid communicated thereto;
   first, second and third tubular means coaxially arranged one within the other in radially spaced apart relationship and surrounded by said piston coaxial therewith;
   first and second axially spaced apart stop means on said first tubular means and engaged by said second tubular means to establish brake released and energized positions, respectively;
   resilient means operatively connected to said first and second tubular means for urging said second tubular means axially into engagement with said first stop means;
   stem means secured at one end to said piston and extending therefrom axially through said third tubular means; and
   annular means secured to the free end of said stem and engageable with said third tubular means;
   said piston being slidably carried on said first tubular means and urged by said pressurized fluid against the resistance of said resilient means during a brake application thereby causing said second tubular means to engage said second stop means whereupon said third tubular means is fixed in position and said annular means is forcibly urged axially therethrough in response to a predetermined force derived from said piston to thereby deform said third tubular means radially outwardly and allow said piston to advance relative to said first tubular means accordingly to compensate for wear of said brake;
   said brake being released in response to depressurization of said piston whereupon said piston is retracted in response to said resilient means urging said second tubular means into engagement with said first stop means to establish a predetermined brake running clearance.

2. A brake actuating piston and adjust/reset means housed therein as claimed in claim 1 and further including:
   sleeve means disposed in said cavity in radially spaced apart relationship to said first tubular means;
   said piston having a skirt portion slidably engaged with said sleeve means and said first tubular means and provided with a base portion.

3. A brake actuating piston and adjust/reset means housed therein as claimed in claim 1 wherein:
   said first tubular means has a radially outwardly extending end wall threadedly engaged with said casing.

4. A brake actuating piston and adjust/reset means housed therein as claimed in claim 1 wherein:
   said resilient means is a compression spring.

5. A brake actuating piston and adjust/reset means housed therein as claimed in claim 1 wherein:
  said stem means is removably secured to said piston to permit withdrawal of said stem means from said piston.

6. A brake actuating piston and adjust/reset means housed therein as claimed in claim 1 wherein:
  said annular means is removably secured to the free end of said stem by a lock nut threadedly engaged with the free end of said stem.

7. A brake actuating piston and adjust/reset means housed therein as claimed in claim 1 wherein:
  said second stop means is defined by an annular shoulder formed on said first tubular means.

8. A brake actuating piston and adjust/reset means housed therein as claimed in claim 1 wherein:
  said first stop means is an annular ring removably secured to said first tubular means.

9. A brake actuating piston and adjust/reset means housed therein as claimed in claim 4 wherein:
  said first tubular means is provided with a radially inwardly extending shoulder against which one end of said compression spring bears;
  said second tubular member is provided with a radially outwardly extending annular ring member bearing thereagainst and against which the opposite end of said compression spring bears.

10. A brake actuating piston and adust/reset means housed therein as claimed in claim 9 wherein:
  said annular ring member is adapted to engage said first and second stop means.

* * * * *